(12) United States Patent
Hinze

(10) Patent No.: US 6,610,249 B1
(45) Date of Patent: Aug. 26, 2003

(54) AQUEOUS SOLUTION FOR DISINFECTING AN ANIMAL PRODUCT, A METHOD AND A PLANT FOR SUCH DISINFECTION

(75) Inventor: Gilbert Theo Hinze, Randburg (ZA)

(73) Assignee: Radical Waters IP (PTY) LTD, Erasmuskloof (ZA)

( * ) Notice: Subject to any disclaimer, the term of this patent is extended or adjusted under 35 U.S.C. 154(b) by 0 days.

(21) Appl. No.: 09/529,736

(22) PCT Filed: Oct. 23, 1998

(86) PCT No.: PCT/US98/22370
§ 371 (c)(1),
(2), (4) Date: Jun. 19, 2000

(87) PCT Pub. No.: WO99/20129
PCT Pub. Date: Apr. 29, 1999

(30) Foreign Application Priority Data

Oct. 23, 1997 (ZA) .................................................. 97/9488

(51) Int. Cl.$^7$ ................................................ A61L 2/00
(52) U.S. Cl. ............................. 422/29; 99/536; 99/473; 422/28; 422/32; 422/293; 426/235; 426/321; 426/521
(58) Field of Search ................................. 422/1, 22, 23, 422/28, 29, 32, 33, 40, 293; 426/235, 321, 521; 99/536, 473

(56) References Cited

U.S. PATENT DOCUMENTS

| | | | | |
|---|---|---|---|---|
| 3,819,329 A | * | 6/1974 | Kaestner et al. | ............ 204/271 |
| 3,996,386 A | * | 12/1976 | Malkki et al. | .............. 426/321 |
| 5,902,619 A | * | 5/1999 | Rubow et al. | ................ 422/28 |
| 6,103,286 A | * | 8/2000 | Gutzmann et al. | .......... 426/235 |

* cited by examiner

Primary Examiner—Krisanne Thornton
(74) Attorney, Agent, or Firm—Nath & Associates PLLC; Gary M. Nath; Joshua B. Goldberg

(57) ABSTRACT

A composition for disinfecting an animal product comprising an electro-chemically activated, anion-containing aqueous solution. A plant for treating an animal product including a water reservoir (12), a salt feed device (16) for creating an aqueous salt solution, an electrolysis device (18) to produce anolyte and catolyte solutions, an anion mixing tank (28), and a treatment container (30) to apply the solution to an animal product.

9 Claims, 8 Drawing Sheets

FIG. 2

Table 1

SUMMARY: ANOLYTE TEST RESULTS

Treating Animal Product

| No. | Description | Dilution | Summary of Results<br>Fresh | Frozen - 28°C - Thawed |
|---|---|---|---|---|
| 1 | Ovine Offal:<br>Organoleptic shelf life evaluation at ambient winter temperatures | 0:0<br>1:10<br>1:25<br>1:50<br>1:100 | 48 hours<br>120 hours<br>120 hours<br>120 hours<br>120 hours | 48 hours<br>120 hours<br>120 hours<br>120 hours<br>120 hours |
| 2 | Histopathological Changes - Bovine small Intestine Contact time 3 min | C=0:0<br>T=1:50 | Cellular definition<br>Loss after 48 hours<br>Superficial layer sloughing after 120 hours | |
| 3 | Microcidal effect on Vacuum packed beef<br>(deep tissue) | 0:0<br>1:100 | TVC (30 days post treatment)<br>$1,3 \times 10^3 \times 10^3$<br>$2,1 \times 10^2 \times 10^2$ | Kill<br>98,4% |
| 4 | Bovine Liver<br>L1 (+225 mV/2 Min) | T=1:50 | TVC<br>C $1,05 \times 10^3 \times 10^2$     T $3,85 \times 10^2$ | Kill<br>96,3% |

FIG. 3

| | | | | |
|---|---|---|---|---|
| 4,3 KG/12.5l | | Coliforms<br>C 12 000 | T 60 | 99,5% |
| L2 (+143 mV/2 min) | | TVC | | Kill |
| 4,3 kg/12.5l | | C 1,05X10³x10² | T 6,0X10³ | 94,3% |
| L3(+94 mV/2 min) | | Coliforms<br>C 12 000 | T 180 | 98,5% |
| 4,3 kg/12.5l | | TVC<br>C 1,05X10³X10² | T 5,5Xx10² | Kill<br>94,8% |
| | | Coliforms<br>C 12 000 | T 230 | 98,1% |
| Beef Hides | | Slaughter | Temp | Shelf Life (days) |
| T1 folded wet | 1:10 | <12 h | Ambient | 4 |
| T2 folded wet | 1:10 | >12 h | Ambient | 3 |
| T3 folded wet | 1:10 | 2 h | Ambient | 4 |
| T4 folded wet | 1:10 | 2 h | Ambient | 3 |
| T5 folded wet | 1:10 | 2 h | Chilled (15°C) | 17 |
| T6 folded wet | 1:10 | 2 h | Ambient | 5 |
| T7 folded wet | 1:10 | 2 h | Ambient | 5 |
| T8 folded wet | 1:10 | 2 h | Ambient | 4 |

FIG. 4

| | | | Org. | Treated | Control | |
|---|---|---|---|---|---|---|
| 6 | Sheep Plucks | 1:10 | TPC | 2,85 X 10³ | 2,3 x 10³X10² | >99% |
| | | | Pseudomonas | NG | 900 | >99% |
| 7 | Ostrich Offal | 1:10 | Org. | Treated | Control | |
| | | | TPC | 1,73 X 10³ | 4,944X 10³X10² | >99% |
| | | | E.coli | NG | 8600 | >99% |
| | | | Pseudomonas | NG | 2,52X 10²X10³ | >99% |
| 8 | Fish : Hake | 1:20 | Both dilutions resulted in a 2-day extension of shelf life at 20°. | | | |
| 9 | Sausage Casings | 1:40 | Org. | Treated | Control | |
| | | | TPC | 240 | 8 160 000 | |
| | | | Coliforms | NG | 521 600 | |
| | | | A. perfringeas | NG | 8 900 | |

FIG. 5

Table 2: Statistical analysis of the Total count of the 12 Control and 12 Anolyte treated carcasses.

| Source of variation | d.f. | Significance level |
|---|---|---|
| Treatment (control vs. anolyte) | 1 | 0,0001 |

FIG. 6

Table 3: Total counts of beef carcasses treated with Anolyte vs. a Control group.

| Treatment | Log/24 cm$^2$ |
|---|---|
| Control group after slaughter | 1,6 |
| Control group in chiller | 1,2 |
| Anolyte group after slaughter, before fogging | 1,6 |
| Anolyte group after fogging with Anolyte | 0,54 |

FIG. 7

Table 4: Statistical analysis of the metmyoglobin accumulation of loin steaks, topside mince and rumpsteaks, stored at 4 °C for 96 h

| Source of variation | d.f. | Significance level |
|---|---|---|
| Treatment | 3 | 0,0147 |
| Meat cut | 2 | 0,0001 |
| Shelf life period | 4 | 0,0001 |
| Treatment X Meat cut | 6 | 0,0020 |
| Treatment X Meat cut | 12 | 0,6302 |
| Meat cut X Meat cut | 8 | 0,0001 |

FIG. 8

Table 5: Metmyoglobin accumulation (brown discoloration) for main effects

| Main effects | Shelf life (h) | % Mmb | Std. Error |
|---|---|---|---|
| Treatment | Anolyte | 24.3 | 0.7 |
| | Anolyte-H20-Catolyte | 27.5 | 0.2 |
| | Catolyte | 27.1 | 1.0 |
| | Control | 28.1 | 2.3 |
| Meat cut | Loin steak | 19.6 | 3.2 |
| | Topside Mince | 30.7 | 2.0 |
| | Rump steak | 29.9 | 2.2 |
| Shelf life period | 0 | 8.2 | 1.3 |
| | 24 | 22.0 | 1.2 |
| | 48 | 28.6 | 1.2 |
| | 72 | 34.2 | 1.8 |
| | 96 | 40.7 | 5.1 |

FIG. 9

Table 6: Metmyoglobin accumulation of loin steaks during a shelf life study of 0- 96h at 4 °C.

| Main effects | Shelf life (h) | % Mmb | Std. Error |
|---|---|---|---|
| Control | 0 | 12.9 | 0.7 |
| | 24 | 16.7 | 0.2 |
| | 48 | 21.0 | 1.0 |
| | 72 | 24.5 | 2.3 |
| | 96 | 26.7 | 3.2 |
| Anolyte | 0 | 5.2 | 2.0 |
| | 24 | 15.9 | 2.2 |
| | 48 | 22.0 | 1.3 |
| | 72 | 23.0 | 1.2 |
| | 96 | 27.0 | 1.2 |
| Anolyte-H20-Catholyte | 0 | 4.4 | 1.8 |
| | 24 | 20.2 | 5.1 |
| | 48 | 24.5 | 3.9 |
| | 72 | 20.2 | 3.0 |
| | 96 | 27.0 | 1.3 |
| Catholyte | 0 | 10.3 | 5.0 |
| | 24 | 15.9 | 2.5 |
| | 48 | 22.5 | 1.4 |
| | 72 | 25.2 | 0.7 |
| | 96 | 26.8 | 0.7 |

FIG. 10

Table 7: Metmyoglobin accumulation of topside mince during a shelf life study of 0-96h at 4 °C

| Main effects | Shelf life (h) | % Mmb | Std. Error |
|---|---|---|---|
| Control | 0 | 10.8 | 2.1 |
| | 24 | 24.6 | 1.6 |
| | 48 | 29.6 | 1.4 |
| | 72 | 35.7 | 2.2 |
| | 96 | 40.8 | 4.6 |
| Anolyte | 0 | 8.3 | 2.1 |
| | 24 | 19.7 | 2.2 |
| | 48 | 27.3 | 1.1 |
| | 72 | 40.8 | 2.8 |
| | 96 | 47.2 | 2.7 |
| Anolyte-H20-Catholyte | 0 | 11.5 | 1.9 |
| | 24 | 25.2 | 2.9 |
| | 48 | 36.9 | 2.8 |
| | 72 | 39.7 | 0.9 |
| | 96 | 55.7 | 1.7 |
| Catholyte | 0 | 6.7 | 2.4 |
| | 24 | 26.5 | 1.3 |
| | 48 | 34.8 | 1.4 |
| | 72 | 40.6 | 1.9 |
| | 96 | 52.8 | 4.7 |

FIG. 11

Table 8: Metmyoglobin accumulation of rump steaks during a shelf life study of 0-96h at 4 °C

| Main effects | Shelf life (h) | % Mmb | Std. Error |
|---|---|---|---|
| Control | 0 | 9.9 | 1.4 |
| | 24 | 32.3 | 1.4 |
| | 48 | 37.0 | 5.3 |
| | 72 | 43.9 | 7.5 |
| | 96 | 54.9 | 7.3 |
| Anolyte | 0 | 5.2 | 2.3 |
| | 24 | 24.1 | 1.9 |
| | 48 | 27.1 | 3.9 |
| | 72 | 38.0 | 4.4 |
| | 96 | 33.6 | 5.3 |
| Anolyte-H20-Catholyte | 0 | 4.5 | 1.8 |
| | 24 | 21.5 | 5.0 |
| | 48 | 32.6 | 3.0 |
| | 72 | 40.5 | 7.8 |
| | 96 | 49.1 | 8.1 |
| Catholyte | 0 | 9.0 | 2.8 |
| | 24 | 22.0 | 1.5 |
| | 48 | 27.6 | 2.9 |
| | 72 | 38.8 | 3.4 |
| | 96 | 47.6 | 6.9 |

FIG.12

Table 9: The effect of Anolyte Fogging on the mass loss during chilling
(Pig Carcasses)

| Carcass | Warm Mass (kg) | Cold Mass (kg) | Mass (kg)% loss |
|---|---|---|---|
| C1 | 50.4 | 48.4 | 3.97 |
| C2 | 56.4 | 54.5 | 3.37 |
| C3 | 47.8 | 45.9 | 3.97 |
| C4 | 50.4 | 48.5 | 3.77 |
| C5 | 41.8 | 40.9 | 2.15 |
| C6 | 36 | 34.3 | 4.72 |
| A1 | 54 | 53 | 1.85 |
| A2 | 36.4 | 35.1 | 3.57 |
| A3 | 50.2 | 48.6 | 3.19 |
| A4 | 44.8 | 44 | 1.79 |
| A5 | 45.4 | 44.7 | 1.54 |
| A6 | 47.8 | 46.8 | 2.09 |

3.66-2.34 = 1.32% Saving

C = Control
A = Anolyte
Numbers 1-6 = Carcass number

AQUEOUS SOLUTION FOR DISINFECTING AN ANIMAL PRODUCT, A METHOD AND A PLANT FOR SUCH DISINFECTION

FIELD OF THE INVENTION

This invention relates to a composition for disinfecting an animal product, to a method of disinfecting an animal product, to a treatment plant and to an animal product disinfected with such a composition.

BACKGROUND OF THE INVENTION

For the purposes of this specification, the term "animal product" should be construed to include within its meaning the carcass or a product obtained from the carcass of an animal, including its skin, coat, hide or feathers and the word "animal" should be construed to include within its meaning sheep, cattle, goats, pigs, chickens, ostriches, fish and the like from which a carcass or a product could be obtained. The Applicant envisages further that the invention will be applicable particularly, but not exclusively, to the treatment of animal products in the form of food and food-related products. Such products include fish, meat and meat-related products such as sausage casings, offal, waste produced in meat-producing plants such as fisheries, abattoirs and the like. It is also envisaged that treatment would result in shelf life extension through decontamination of the various products.

OBJECT OF THE INVENTION

It is accordingly an object of the invention to provide a novel composition for disinfecting animal products as well as the related animal products and method.

SUMMARY OF THE INVENTION

In accordance with a first aspect of the invention there is provided a method of disinfecting an animal product, the method including the step of exposing the animal product to a composition comprising an electro-chemically activated, anion-containing aqueous solution.

The solution may be an aqueous solution of a salt. The salt may be sodium chloride. In particular, it may be non-iodated sodium chloride or potassium chloride.

The method may include the steps of diluting the anion-containing solution to a pre-determined concentration and exposing the animal product to an appropriate quantity of the diluted anion-containing solution and for a predetermined time period in a treatment facility.

If desired, the method may include a preliminary step of washing or rinsing the animal product in a washing vessel prior to treatment in the treatment container. Washing or rinsing may be with water obtained from the said source of water. The method may then include collecting effluent water from the washing vessel, clarifying the effluent water by exposing it to an appropriate quantity of the cation-containing solution, disinfecting the clarified water by treating it with an appropriate quantity of the diluted anion-containing solution and re-circulating the clarified and disinfected water.

The anion-containing solution and the cation-containing solution may be produced by an electrochemical reactor or so-called electrolysis device. The electro chemical reactor may include a through flow, electro chemical cell having two co-axial cylindrical electrodes with a coaxial diaphragm between them so as to separate an annular inter electrode space into a catalytic and an analytic chamber. The anion-containing solution is referred to hereinafter for brevity as the "anolyte solution" and the cation-containing solution is referred to hereinafter for brevity as the "catholyte solution".

During the electrolysis process, various radical cation and radical anion species are produced. Generally, a 10% aqueous NaCl solution of water is added to tap water where it is electrolysed in the anion and cation chambers to produce radical cation and radical anion species having extremely high redox potentials of between +500 and +1170 mV and about −980 mV respectively. These species may be labile after about 96 hours with no residues so as to disappear being produced.

The anolyte solution generally may have a pH of about 2–8 and a redox potential of about +1170 mV. The species present in the anolyte solution may include $ClO$; $ClO^-$; $HClO$; $OH^-$; $HO_2-$; $H_2O_2$; $O_3$; $S_2O_8^{2-}$ and $Cl_2O_6^{2-}$.

These species have been found to have a synergistic anti-bacterial effect which is generally stronger than that of chemical bactericides and has been found to be particularly effective against viral organisms and spore and cyst forming bacteria.

The catholyte solution generally may have a pH of about 12–13. The species present in the catholyte solution may include $NaOH$; $KOH$; $CA(OH)_2$; $Mg(OH)_2$; $HO^-$; $H_3O_2^-$; $HO_2^-$; $H_2O_2^-$; $O_2^-$; $OH^-$; $O_2^{2-}$.

Exposing the animal product or carcass to the anolyte solution may include soaking, rinsing or dipping the animal product in the anolyte solution, applying the anolyte solution via an atomising or fogging process or freezing the anolyte solution and using the ice produced to pack the animal product. The soaking, rinsing or dipping process is suitable for products such as offal which can be handled with relative ease, either manually or mechanically. The redox potential of the anolyte solution can be monitored during the process so that the disinfecting process can be monitored and controlled on a continuous basis. The atomising or fogging process is suitable for products such as carcasses when suspended in a chiller. The atomising or fogging process may include the step of atomising the anolyte solution into the atmosphere in an enclosure to be treated, forming droplets of between 5 and 100 micrometers. The atomising or fogging process is preferably repeated at predetermined intervals so as to maintain a suitable level of anolyte solution concentration in the atmosphere, thus using the optimum microcidal and other properties of the anolyte solution in accordance with the required administration rate. The anolyte solution also may be applied by an atomising process in air ducting systems to destroy air-borne microorganisms. The use of frozen anolyte solution has been found to extend the usable life of animal products packed in the frozen anolyte solution, e.g. fish;

In accordance with a second aspect of the invention, there is provided a treatment plant for treating an animal product in accordance with the method of the invention.

The treatment plant may include supply means for supplying water;

feed means for feeding a suitable salt into the water to produce an aqueous salt solution;

an electrolysis device for electrolysing the aqueous solution to produce an anolyte and a catholyte solution;

a mixing and dilution tank for mixing and diluting the anolyte solution; and means for applying the anolyte solution to a product.

The treatment plant may include recycling means for recycling anolyte and catholyte solution into spent process water to disinfect the spent process water.

In accordance with a third aspect of the invention there is provided a composition for disinfecting an animal product comprising an electro chemically activated anion containing aqueous solution, the solution being substantially as herein defined.

In accordance with a fourth aspect of the invention there is provided an animal product characterized in having been disinfected with a composition and/or in a plant or a process as herein defined.

BRIEF DESCRIPTION OF THE DRAWINGS

Embodiments of the present invention are described by way of example with reference to the accompanying drawings wherein:

FIG. 2 is a table providing the results of tests studying the bactericidal and shelf-life prolonging effects of the present anolyte solution.

FIG. 3 is a table providing the results of further tests studying the bactericidal and shelf-life prolonging effects of the present anolyte solution.

FIG. 4 is a table providing the results of further tests studying the bactericidal and shelf-life prolonging effects of the present anolyte solution.

FIG. 5 is a table providing a statistical analysis of tests studying the microbiological quality of beef carcasses after having been fogged with the present anolyte.

FIG. 6 is a table providing the total count of beef carcasses from tests studying the microbiological quality of beef carcasses after having been fogged with the present anolyte.

FIG. 7 is a table providing a statistical analysis of the metmyoglobin accumulation of various steaks after treatment with the present anolyte.

FIG. 8 is a table providing data regarding the metmyoglobin accumulation for main effects after treatment with the present anolyte.

FIG. 9 is a table providing data regarding a shelf life study on the metmyoglobin accumulation of loin steaks after treatment with the present anolyte.

FIG. 10 is a table providing data regarding a shelf life study on the metmyoglobin accumulation of topside mince after treatment with the present anolyte.

FIG. 11 is a table providing data regarding a shelf life study on the metmyoglobin accumulation of rump steaks after treatment with the present anolyte.

FIG. 12 is a table providing data regarding the effects of fogging with the present anolyte on mass loss of pig carcasses during chilling.

DETAILED DESCRIPTION OF THE INVENTION

Figure 1:
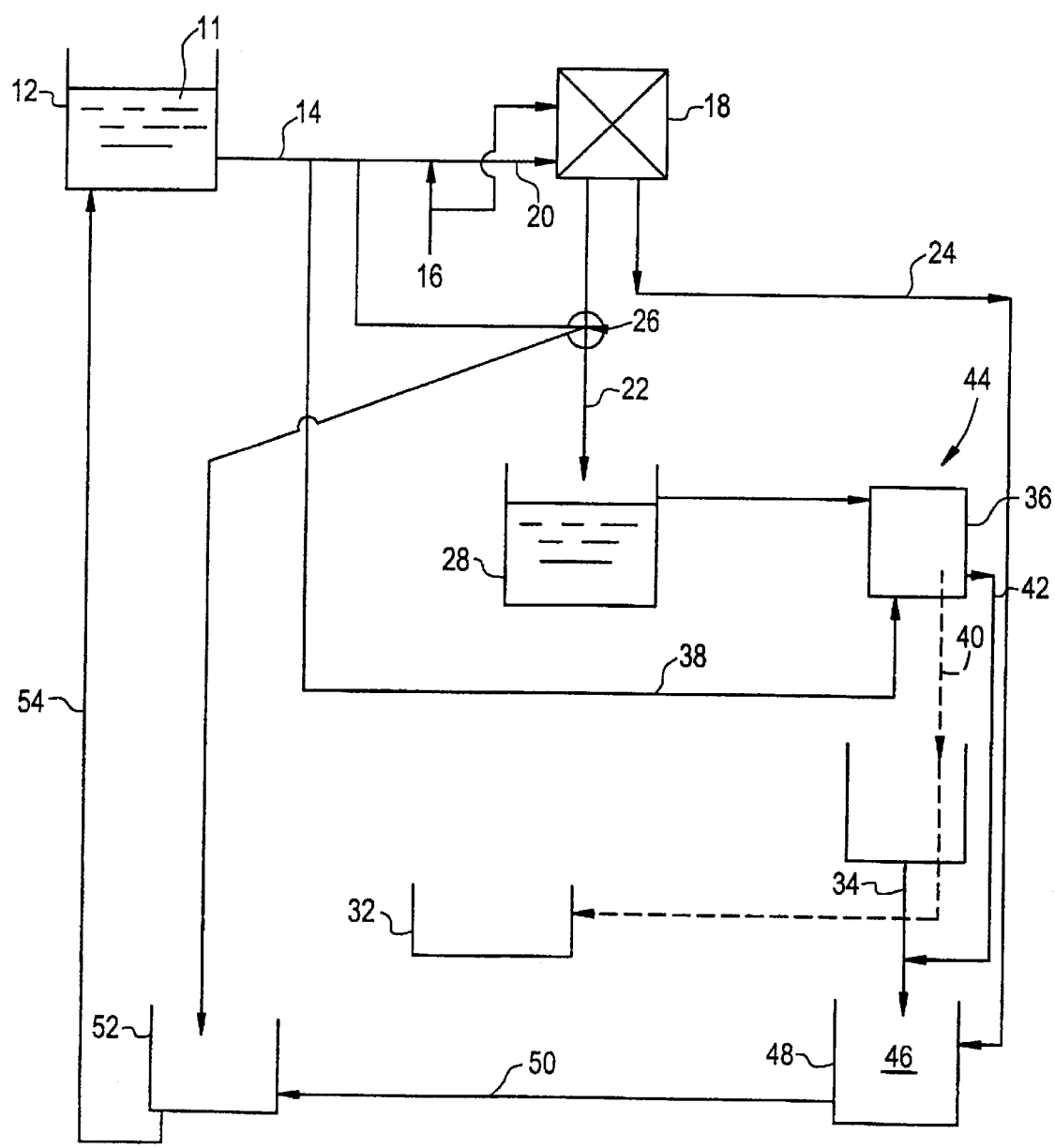
FIG. 1 is a schematic drawing of a treatment plant, showing one embodiment of the present invention.

Preferred embodiments of the invention will now be described by way of an example, with reference to the accompanying schematic drawing illustrating a treatment plant in accordance with the invention, and by way of tests with reference to the tables.

With reference to the drawing, drinking quality water is provided as shown at 11 in a water reservoir 12. If the process and the plant is to be operated with water inferior to, drinking quality water, a pre-treatment step may be executed in the water reservoir 12, or in a container upstream of the water reservoir 12 to raise the quality of the water to that of drinking quality water.

A mother line 14 conducts water from the water reservoir 12 to wherever drinking quality water is required in the process as will become apparent hereinafter.

Reference numeral 18 indicates an electrochemical reactor or so-called electrolysis device. Water from the motherline 14 is exposed to sodium chloride as indicated at 16 to produce a sodium chloride solution. The sodium chloride solution is fed into the electrolysis device 18, as well as water from the water reservoir as indicated by reference numeral 20. By electrolysis, an anion-containing solution or anolyte solution is produced as indicated by reference numeral 22. Also a cation-containing solution or catholyte solution is produced as indicated by reference numeral 24.

The anolyte solution at 22 is admixed with water from the motherline in a manifold valve 26 to produce an anolyte solution of predetermined strength which can selectively be directed into an anion mixing tank 28.

Animal product to be treated in accordance with the invention, for example an offal in an abattoir, is introduced into a washing container 36 as indicated by reference numeral 44. In the washing container 36, water is drawn from the motherline 14 as indicated at 38 to wash the animal product. After washing, the animal product is transported as indicated by reference numeral 40 into a treatment container 30. Effluent water is collected from the washing container 36 as indicated by reference numeral 42.

The pre-washed animal product is exposed in the treatment container 30 to an appropriate quantity of the anolyte solution from the mixing tank 28 to disinfect the animal product. The disinfected animal product is transported to a product processing and packaging station 32 where it is further processed. Used solution after disinfection is collected from the treatment container 30 as indicated by reference numeral 34.

The effluent water at 42 and the used solution at 34 are added and are conducted as indicated by reference numeral 46 to a clarification container 48 where it is exposed to an appropriate quantity of the catholyte solution 24 to clarify it by means of flocculation, clarification or the like. The clarified water is conducted as indicated by reference numeral 50 to a disinfecting container 52 where an appropriate quantity of the anolyte solution of predetermined strength is obtained via the manifold valve 26 to produce disinfected water which is re-circulated to the water reservoir 12 as indicated by reference numeral 54.

Tests

An electro chemical reactor, including a through flow electro chemical cell having coaxial cylindrical electrodes with a coaxial diaphragm between them so as to separate an annular inter electrode space into a catalytic and an analytic chamber, was used to produce anolyte and catholyte for the tests.

Tests to 1–9

In a series of 9 tests, the bactericidal and shelf-life prolonging effect of the anolyte solution was tested on animal products such as offal, meat, fish, hides, etc. The experimental protocol and the subsequent results are summarised in Table 1 below in which the experiments are numbered from 1 to 9.

In test 4, 3 bovine livers were submerged consecutively for 2 minutes. Redox depletion was measured after each submersion as well as microbiological counts.

Test 10

A further test was conducted to determine the microbiological quality of beef carcasses after having been fogged with anolyte.

Treatment

During the test 24 beef carcasses were used, 12 for a control group and 12 for a test group. The 12 carcasses from the control group and the 12 carcasses from the test group were all microbiologically sampled directly after slaughter. After the carcasses had been placed in the respective chillers, the 12 beef carcasses from the test group were fogged with Anolyte. All the beef carcasses (treated and controls) were microbiologically monitored after the fogging process was completed.

Microbiological Sampling

All the carcasses were microbiologically monitored using rodac plates. Samples were taken at 4 positions on both the left and right sides of each carcass i.e. the Lateral surface at the 7th and 8th vertebrae;

Medial side of the hind limb;

Carcass surface at the breast area of the 7th and 8th rib;

Proximal part of the neck area; and

Carcass surface in the perineal region.

After sampling, the rodac plates were incubated at 25° C. for 3 days. A total count per 24 $cm^2$ was then determined.

Statistical Analysis

An ANOVA procedure was used to determine differences statistically between treatments.

A statistical analysis of the total count of the 12 control and 12 test carcasses is shown in Table 2.

A total count of the beef carcasses of both the control and the test group is shown in Table 3.

Microbiological Evaluation

According to the statistical analysis the microbial contamination of the 12 Anolyte treated carcasses was significantly lower after fogging than the contamination level of the control carcasses (Table 2:P=0,0001).

Table 3 clearly indicates that the total count of the control group of carcasses vs the test group of carcasses were at a similar levels just after slaughter (log 1,6/24 $cm^2$). However, the total count of the test group was significantly reduced after fogging from log 1,6/24 $cm^2$ to log 0,54/24 $cm^2$. The test group beef carcasses therefore had significantly lower total counts than the control group beef carcasses.

Test 11–16

A further series of tests were conducted with Anolyte aimed at preventing the oxidation of meat. During the trials the following meat cuts were used: beef loin steaks, beef topside mince and chicken drumsticks.

Treatment

The treatment groups were as follows:
1. Control
2. Anolyte
3. Anolyte-$H_2O$-Catolyte
4. Catolyte.

All the rump and loin steaks, as well as the chicken drumsticks were submerged into the respective treatment liquids for a period of 3 minutes. The topside mince was treated with a hand held sprayer.

Shelf Life Study

After each treatment, all the cuts were singly placed on polystyrene trays and overwrapped with PVC. All the cuts were then placed in retail display cabinets and displayed for a period of 24, 48, 72 and 96 hours at 4° C. After each subsequent display period, cuts from each treatment were analysed for colour.

Colour

Sceptrophotometic reflectance analyses were used by taking readings from the overwrapped steaks to calculate the percentage of metmyoglobin (MMb), following the procedures of Krywicki (1979).

Statistical Analysis

ANOVA procedures were used to determine between treatments over time.

A statistical analysis of the metmyoglobin accumulation of loin steaks, topside mince and rump steaks, stored at 4° C. for 96 hours, is shown in Table 4.

Metmyoglobin accumulation (brown discoloration) for main effects is shown in Table 5.

Metmyoglobin accumulation of loin stakes during a shelf life study of 0–96 h at 4° C. is shown in Table 6.

Metmyoglobin accumulation of topside mince during a shelf life study of 0–96 h at 4° C. is shown in Table 7.

Metmyoglobin accumulation of rump steaks during a shelf life study of 0–96 h at 4° C. is shown in Table 8.

Metmyoglobin Accumulation (Brown Discoloration)

According to statistical analysis, all the main effects (treatment, meat cut, shelf life period) were significantly influenced (P valves <0.05) by the accumulation of metmyoglobin (Mmb) (Table 4). Metmyoglobin gives an indication of the brown discoloration, which has taken places on each meat cut.

As shown in Table 5, the samples receiving the Anolyte treatment discoloured significantly (P=0,0147) less during the shelf life study than the control samples, the samples receiving the Catolyte or combined Anolyte-Catolyte treatment. Furthermore, the loin cuts discoloured less during the shelf life period than the other two cuts included in the study.

According to a study done by Hood, 1980, a discoloration level of 20% indicates a reduction of 50% in the amount of sales. If a cut off point of ca. 20–25% metmyoglobin is taken as the end of retail acceptability, the topside mince treated with Anolyte in this trial achieved a 48 hour shelf life. In contract, all the other mince samples treated (control, Catolyte, Anolyte-Catolyte combination) only achieved a 24 hour retail shelf life according to this criteria.

If this cut off point of ca 20–25% metmyoglobin is again applied to the rump steaks assessed during this trial, the rump steaks treated with Anolyte and Catolyte in this trial achieved a 48 hour shelf life, while the rump steaks treated with the Anolyte-Catolyte combinations achieved a 24 hour retail shelf life. In contrast, the control samples were only acceptable on time 0 of study, i.e. a 0 hour retail shelf life, according to this criterion.

Test 17

A final test was conducted with Anolyte aimed at determining the reduction in weight loss in pig carcasses during chilling.

The carcasses were stored at about –3° C. in a cold room. An Anolyte atmosphere was produced by means of fogging.

The Anolyte, generated at a total flowrate of about 750 ml/min, had the following characteristics:

| | |
|---|---|
| TDS | 6,04 g/l |
| pH | 6–8 |
| ORP | +762 mV |
| Application | 150 ml/$m^3$ |

The reduction in weight loss during chilling due to Anolyte fogging is shown in Table 9. A reduction of 1.32% in weight loss was measured and calculated The treatment of an animal product as described above has been found to extend the shelf life and quality of the product as a result of the anti-microbial action of the anolyte solution.

Treatment of sausage casings for example resulted in a substantial bacterial count reduction.

The Applicant believes that the oxidising free radicals present in the anolyte solution act synergistically at a bacterial cellular level.

It has been found that the effectiveness of the anolyte solution depends upon the flow rate through the reactor which determines the concentration of the anolyte, as measured by the oxidation-reduction potential (ORP), or redox potential of the anolyte solutions, the flow rate through the reactor the exposure time, i.e. the contact time between the contaminated product surface and the anolyte solution and the temperature during application. A flow rate of 750 ml/min through a pair of electro chemical cells have been found to be most effective. By measuring the redox potential of the anolyte solution during the treatment, for example, of an animal product, the available free radical concentration can be determined and monitored. Anolyte has been found to be more effective at lower than at higher temperatures and at neutral pH ranges.

It will be appreciated that many variations in detail are possible without departing from the scope and/or spirit of the invention as claimed in the claims hereinafter.

What is claimed is:

1. A method of disinfecting an animal product, the method comprising the steps of producing an electrochemically activated bactericidal aqueous solution with an electrochemical reactor, wherein the electrochemical reactor includes a through flow, electrochemical cell having two co-axial cylindrical electrodes with a co-axial diaphragm between them so as to separate an annular inter electrode space into a cathodic and an anodic chamber, such that the electrochemically activated bactericidal aqueous solution includes separable and both of an aqueous, mixed oxidant, predominantly anion-containing solution and an aqueous, mixed reductant, predominantly cation-containing solution; separating the aqueous, mixed oxidant, predominantly anion-containing solution from the aqueous, mixed reductant, predominantly cation-containing solution; and exposing the animal product to a composition comprising the electrochemically activated, aqueous, mixed oxidant, predominantly anion-containing solution.

2. The method as claimed in claim 1 wherein the aqueous solution has a redox potential of between +500 and +1170 mV and a pH of about 2–8.

3. The method as claimed in claim 1 including at least one of the steps of soaking, rinsing or dipping the animal product in the solution, applying the solution via an atomising or fogging process and freezing the solution and using the ice produced to pack the animal product.

4. The method as claimed in claim 3 wherein the atomising or fogging process includes the steps of atomising the solution into the atmosphere at a droplet size of between 5 and 100 micrometers.

5. A treatment plant for treating an animal product in accordance with the method of the invention, the treatment plant including supply means for supplying water;

feed means for feeding a suitable salt into the water to produce an aqueous salt solution;

an electrolysis device for electrolysing the aqueous solution to produce an anolyte and a catholyte solution, wherein the electrolysis device includes a through flow, electrochemical cell having two co-axial cylindrical electrodes with a co-axial diaphragm between them so as to separate an annular inter electrode space into a cathodic and an anodic chamber, such that the electrochemically activated bactericidal aqueous solution includes separable and both of an aqueous, mixed oxidant, predominantly anion-containing solution and an aqueous, mixed reductant, predominantly cation-containing solution;

a mixing and dilution tank for mixing and diluting the anolyte solution; and means for applying the anolyte solution to a product.

6. A composition for disinfecting an animal product comprising an electrochemically activated, aqueous, mixed oxidant, predominantly anion-containing solution.

7. An animal product having been disinfected with a method as claimed in claim 1.

8. An animal product having been disinfected by use of a composition as claimed in claim 6.

9. An animal product having been disinfected in a treatment plant as claimed in claim 5.

* * * * *